(12) United States Patent
Wang

(10) Patent No.: US 7,748,906 B2
(45) Date of Patent: Jul. 6, 2010

(54) ENGAGING DEVICE OF LINEAR SLIDING RAIL

(75) Inventor: Chin-Hsiang Wang, Sinjhuang (TW)

(73) Assignee: OME Technology Co., Ltd., Taipei County (TW)

( * ) Notice: Subject to any disclaimer, the term of this patent is extended or adjusted under 35 U.S.C. 154(b) by 434 days.

(21) Appl. No.: 11/976,337

(22) Filed: Oct. 24, 2007

(65) Prior Publication Data
US 2009/0067763 A1 Mar. 12, 2009

(30) Foreign Application Priority Data
Sep. 7, 2007 (TW) .............................. 96215099 U

(51) Int. Cl.
*F16C 29/06* (2006.01)
(52) U.S. Cl. ........................................................ 384/45
(58) Field of Classification Search ............. 384/43–45
See application file for complete search history.

(56) References Cited
U.S. PATENT DOCUMENTS

| | | | | |
|---|---|---|---|---|
| 6,200,031 B1 * | 3/2001 | Faulhaber et al. | ............. | 384/45 |
| 6,520,681 B2 * | 2/2003 | Ishihara | ........................ | 384/45 |
| 2002/0021847 A1 * | 2/2002 | Wu | ................................ | 384/45 |
| 2002/0181810 A1 * | 12/2002 | Menges et al. | ................. | 384/45 |
| 2004/0146228 A1 * | 7/2004 | Lee et al. | ........................ | 384/45 |
| 2005/0018934 A1 * | 1/2005 | Lee et al. | ........................ | 384/45 |
| 2006/0029306 A1 * | 2/2006 | Ishihara | ........................ | 384/45 |
| 2006/0078236 A1 * | 4/2006 | Lee | .............................. | 384/45 |

* cited by examiner

*Primary Examiner*—Thomas R Hannon
(74) *Attorney, Agent, or Firm*—Rosenberg, Klein & Lee

(57) ABSTRACT

An engaging device of a linear sliding rail includes a sliding rail and a sliding block. The sliding block comprises a sliding base body, a supporting body and two connecting bodies. The front and rear ends of the sliding base body have a positioning plate respectively. The two locking pieces each comprises hooks. The hook locks the two connecting bodies at the front and rear ends of the sliding base body. The hook abuts against one end of the abutting piece. The other end of the abutting piece abuts against front and rear end faces of the supporting body respectively. Via this arrangement, when the locking piece locks the two connecting bodies at both ends of the sliding base body, it also generating a pre-pressure to press the supporting body, thereby assembling the supporting body and the two connecting bodies on the sliding base body tightly and firmly.

12 Claims, 6 Drawing Sheets

ENGAGING DEVICE OF LINEAR SLIDING RAIL

BACKGROUND OF THE INVENTION

1. Field of the Invention

The present invention relates to an engaging device of a linear sliding rail, and in particular to an engaging device for engaging a sliding block tightly to achieve a precise action of a linear sliding rail.

2. Description of Related Art

Precision industrial technologies have almost become one of the bases to accomplish modern high-tech civilization. The precision industrial technologies can be applied to various fields from high-tech industries to traditional industries, such as photo-electronics, semiconductor, horologe, mold and nanotech industries.

In the field of precision industry, a linear sliding rail plays an important role. The linear sliding rail can perform a precise linear displacement, thereby allowing precise machines to generate high-precision transmission, machining and positioning process. The so-called linear sliding rail is generally constituted of a sliding rail and a sliding block linearly displaceable on the sliding rail. The sliding block is constituted of a plurality of precise elements. The sliding block can support an article that is subject to a linear displacement.

Since the linear sliding rail is applied to a high-precision process, the acceptable tolerance is so limited that minor defect of the linear sliding rail may cause a serious result, making the proprietor to suffer from huge loses.

The sliding block is constituted of a sliding base body, a supporting body and two connecting bodies provided on front and rear ends of the sliding base body. The above three components are slidably provided on the sliding rail. Since the sliding block generates an action force in the longitudinal direction (i.e., the direction of displacement) when linearly displacing on the sliding rail, the connecting bodies on the front and rear ends of the sliding block may be subjected to a pressure and a tension force.

The conventional linear sliding rail has primary drawbacks as follows.

The action force generated when the sliding block acts on the sliding rail may also act on the constituent elements such as connecting bodies provided on the front and rear ends of the sliding base body, which in turn generates vibrations, noises and unwanted wear via the minor gap between the constituent elements. In this way, the linear sliding rail may result in a serious error.

Therefore, in view of the above the drawbacks, the inventor proposes the present invention to overcome the above problems based on his deliberate researches.

SUMMARY OF THE INVENTION

The object of the present invention is to provide an engaging device of a sliding linear rail, which is capable of generating a pre-pressure to the sliding block, thereby providing a pressing effect. In this way, the sliding block can have a tight and firm combination structure, thereby avoiding the vibrations, noises and wear.

In order to achieve the above object, the present invention provides an engaging device of a linear sliding rail, which includes a sliding rail and a sliding block provided to straddle the sliding rail. The sliding block comprises: a sliding base body with front and rear ends thereof having a positioning plate, the positioning plate having a plurality of through holes, a plurality of abutting pieces and a plurality of protruding plates, the through hole penetrating through front and rear ends of the positioning plate, the abutting piece being provided in the through hole, the two protruding plates being formed by means of extending from the positioning plate, the protruding plate having locking holes penetrating through the protruding plate; a supporting body provided between the two positioning plates of the sliding base body; two connecting bodies each having two insertion slots and two insertion holes communicating a top surface of the connecting body with the insertion slot, the two connecting bodies being provided on the front and rear ends of the sliding base body, and the protruding plate of the sliding base body being accommodated in the insertion slot; and two locking pieces each comprising a plate and a plurality of hooks extending downwardly from the plate, the hooks of the two locking pieces penetrating through the engaging holes of the protruding plate and the insertion holes of the connecting body to lock the two connecting bodies at the front and rear ends of the sliding base body, the hook abutting one end of the abutting piece, the other end of the abutting piece of the two positioning plates abutting against front and rear end faces of the supporting body respectively.

The present invention has the following effect. The locking piece is locked into the insertion slot and abuts against one end of the abutting piece of the positioning plate. Via this arrangement, when the locking piece locks the two connecting bodies at both ends of the sliding base body, it also generating a pre-pressure to press both ends of the supporting body, thereby assembling the supporting body and the two connecting bodies on the sliding base body tightly and firmly. Therefore, the vibrations, noises and wear can be avoided, so that the linear sliding rail can perform a precise displacement smoothly.

In order to further understand the characteristics and technical contents of the present invention, a detailed description related thereto will be explained with reference to the accompanying drawings. However, it should be understood that the drawings and the description are illustrative but not used to limit the scope of the present invention.

DETAILED DESCRIPTION OF THE PREFERRED EMBODIMENTS

Figure 1:
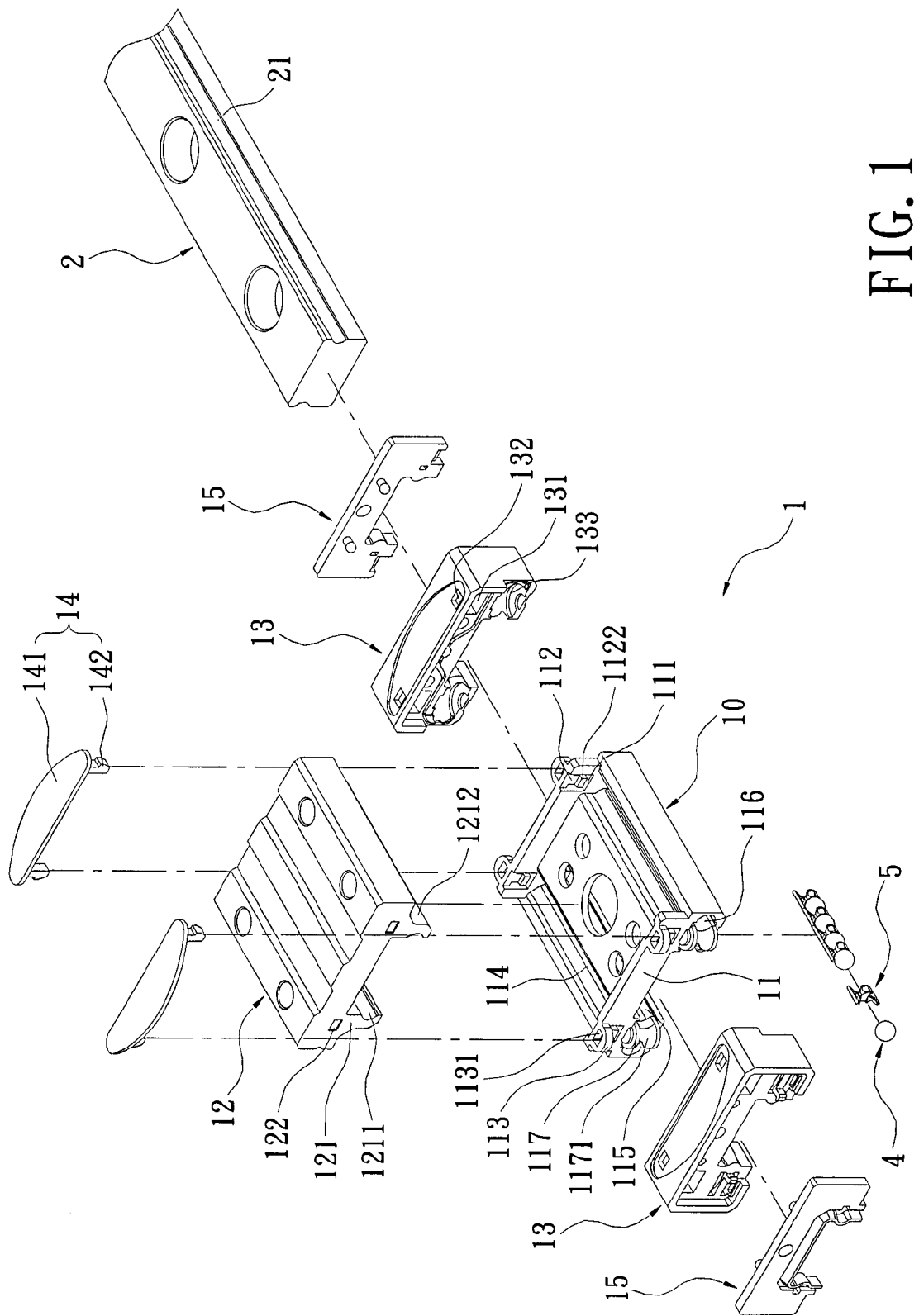
FIG. 1 is an exploded perspective view showing the engaging device of a linear sliding rail of the present invention.

Please refer to FIGS. 1 to 7, which show an engaging device of a linear sliding rail of the present invention including a sliding block 1 and a sliding rail 2. The sliding block 1 is provided to straddle on the sliding rail 2 and is able to linearly slide on the sliding rail 2. The sliding block 1 comprises a sliding base body 10, a supporting body 12, two connecting bodies 13 and two locking pieces 14.

Figure 2:
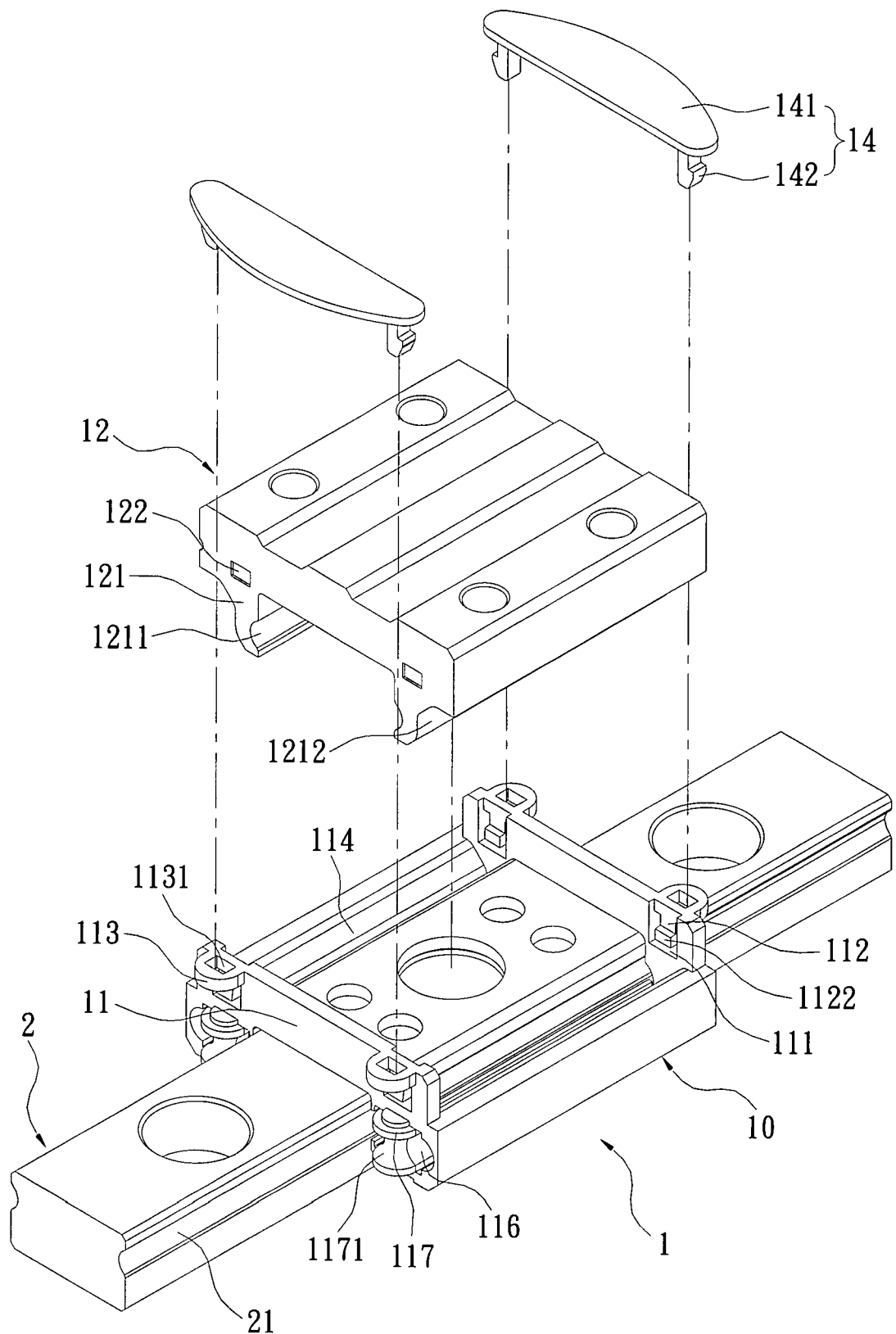
FIG. 2 is a partially exploded perspective view showing the engaging device of a linear sliding rail of the present invention.
Figure 3:
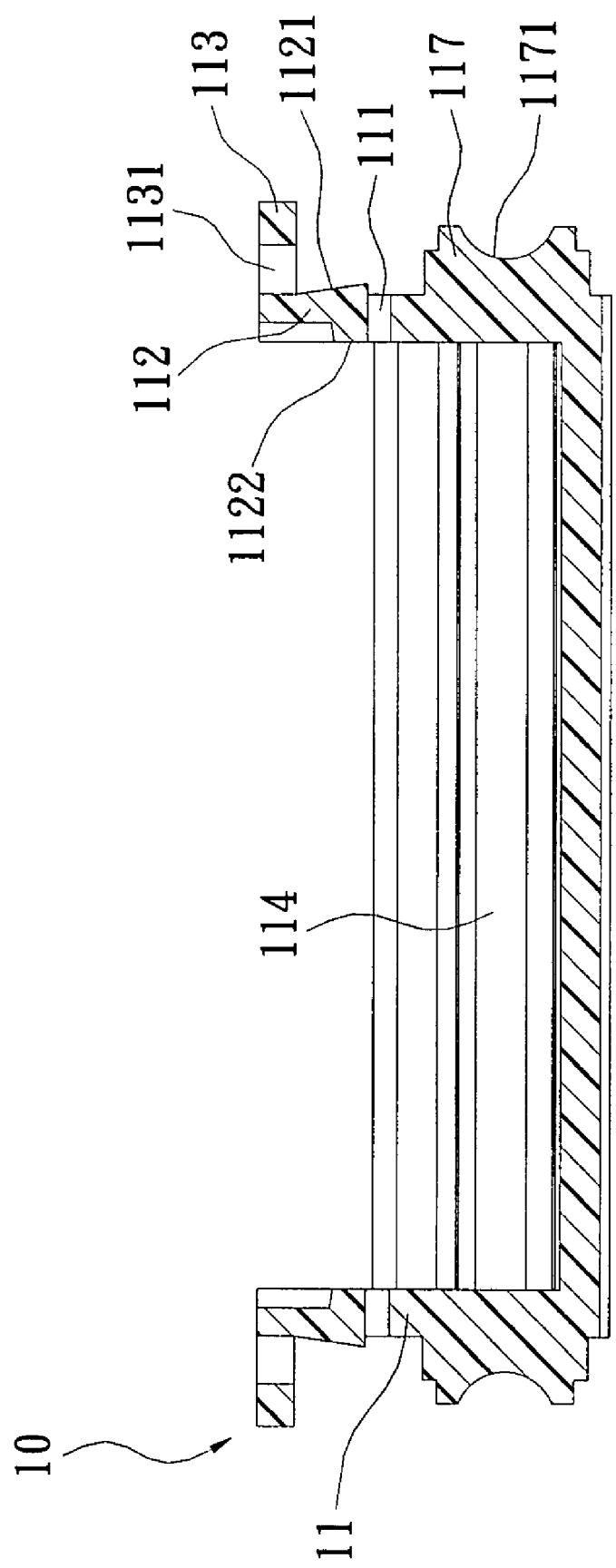
FIG. 3 is a cross-sectional view showing the sliding base body of the engaging device of a linear sliding rail of the present invention.

Please refer to FIGS. 1 to 3. Each of the front and rear ends of the sliding base body 10 has an upwardly extending positioning plate 11. The positioning plate 11 has two through holes 111, two abutting pieces 112 and two protruding plates 113.

With reference to FIG. 3, the two through holes 111 penetrate through the front and rear ends of the positioning plate 11. The abutting piece 112 is provided in the through hole 111. The abutting piece 112 is formed by means of extending downwardly from the upper edge of the through hole 111 and is able to swing reasonably in the through hole 111. The abutting piece 112 has an inclined surface 1121 and a biasing portion 1122. The inclined surface 1121 is formed on one end of the abutting piece 112. The inclined surface 1121 begins at one end of the positioning plate 11 to extend gradually and obliquely from the upper edge of the through hole (i.e., the connecting portion between the abutting piece 112 and the through hole 111) to the outside of the through hole 111. The biasing portion 1122 is a bump that is formed by means of extending from the lower edge of the other end of the abutting piece 112 and is flush with the other end face of the positioning plate 11.

The protruding plate 113 is provided above the through hole 111, and the protruding plate 113 is formed by means of extending horizontally from one end of the positioning plate 11. The protruding plate 113 has a locking hole 1131 penetrating through the upper and lower end faces of the protruding plate 113.

The sliding base body 10 has two hollowed portions 114 at the positions adjacent to both sides thereof. The two hollowed portions 114 penetrate through the upper and lower ends of the sliding base body 10. The underside of each of the two hollowed portions 114 is formed with a supporting surface 115 on the two facing insides of the sliding base body 10.

Below both sides of the sliding base body 10, two first channels 116 are provided to penetrate through the front and rear ends of the sliding base body 10. The two first channels 116 are formed on another side wall faces spaced from the two supporting surfaces 115. The sliding base body 10 is provided with a pair of circumrotation guiding portions 117 on the front and rear ends thereof. The circumrotation guiding portion 117 is provided with a curved groove 1171 that is bent in 180 degrees. One end of the curved groove 1171 is connected with an outlet side of the first channel 116.

The supporting body 12 is provided between the two positioning plates 11 of the sliding base body 10. The supporting body 12 has two extending portions 121 that are provided to correspond to the two hollowed portions 114. The two extending portions 121 extend downwardly from the bottom end of the supporting body 12. Each of the facing inside faces of the two extending portions 121 has a first guiding groove 1211. The first guiding groove 1211 penetrates through the front and rear ends of the extending portion 121 in the longitudinal direction. Each of the opposing outside faces of the two extending portions 121 has a curved abutting surface 1212. The abutting surface 1212 is formed to correspond to the supporting surface 115. The two extending portions 121 of the supporting body 12 penetrate through the two hollowed portions 114 of the sliding base body 10, so that the abutting surface 1212 abuts against the supporting surface 115 tightly. Adhesive agent is applied between the abutting surface and the supporting surface, thereby fixing the supporting body 12 on the sliding base body 10.

Figure 5:
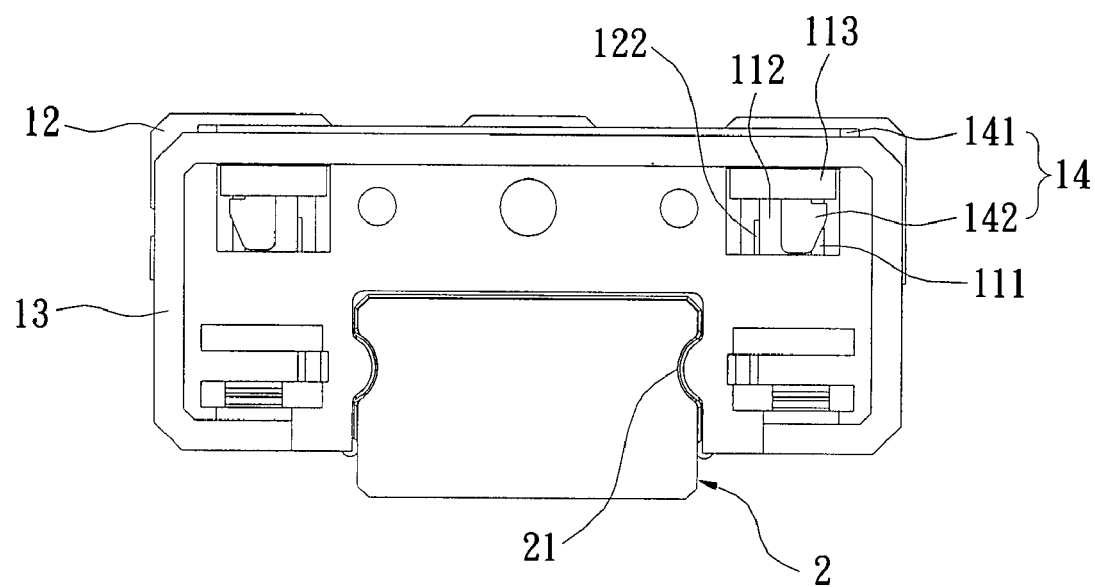
FIG. 5 is a front view showing the engaging device of a linear sliding rail of the present invention.

Please refer to FIGS. 1, 2 and 5. Both sides of the sliding rail 2 have a second guiding groove 21. The first guiding groove 1211 is recessed to correspond to the second guiding groove 21. After the supporting body 12 is fixedly provided on the sliding base body 10, the first guiding grooves 1211 of the two extending portions 121 and the second guiding grooves 21 on both sides of the sliding rail 2 together form two second channels 16 penetrating through the front and rear ends of the sliding base body 10. The circumrotation guiding portion 117 is provided between the first channel 116 and the second channel 16. Both ends of the curved groove 1171 are connected to outlet sides of the first channel 116 and the second channel 16 respectively.

Figure 4:
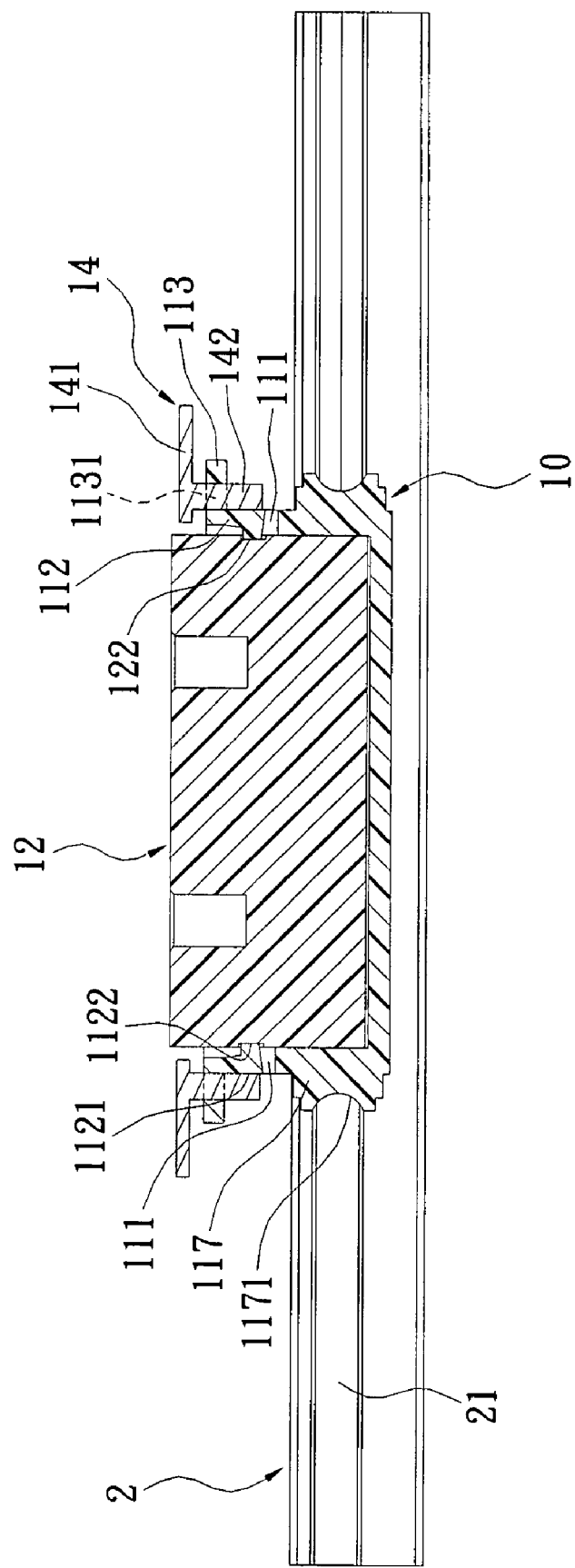
FIG. 4 is an assembled cross-sectional view showing the engaging device of a linear sliding rail of the present invention.

Please refer to FIG. 4. Each of the front and rear ends of the supporting body 12 has two troughs 122. The two troughs 122 are formed to correspond to the biasing portions 1122 of the abutting piece 112, thereby allowing the biasing portion 122 to abut into the trough 122.

The two connecting bodies 13 are formed to correspond to the two end faces of the sliding base body 10 and the cross section of the sliding rail 2. The two connecting bodies 13 are provided on the front and rear ends of the sliding base body 10. Each of the two connecting bodies 13 has two insertion slots 131 and two insertion holes 132 communicating the top surface of the connecting body 13 with the insertion slot 131. The protruding plate 113 of the sliding base body 10 is provided in the insertion slot 131, and the locking hole 1131 of the protruding plate 113 is provided to correspond to the insertion hole 132.

Figure 6:
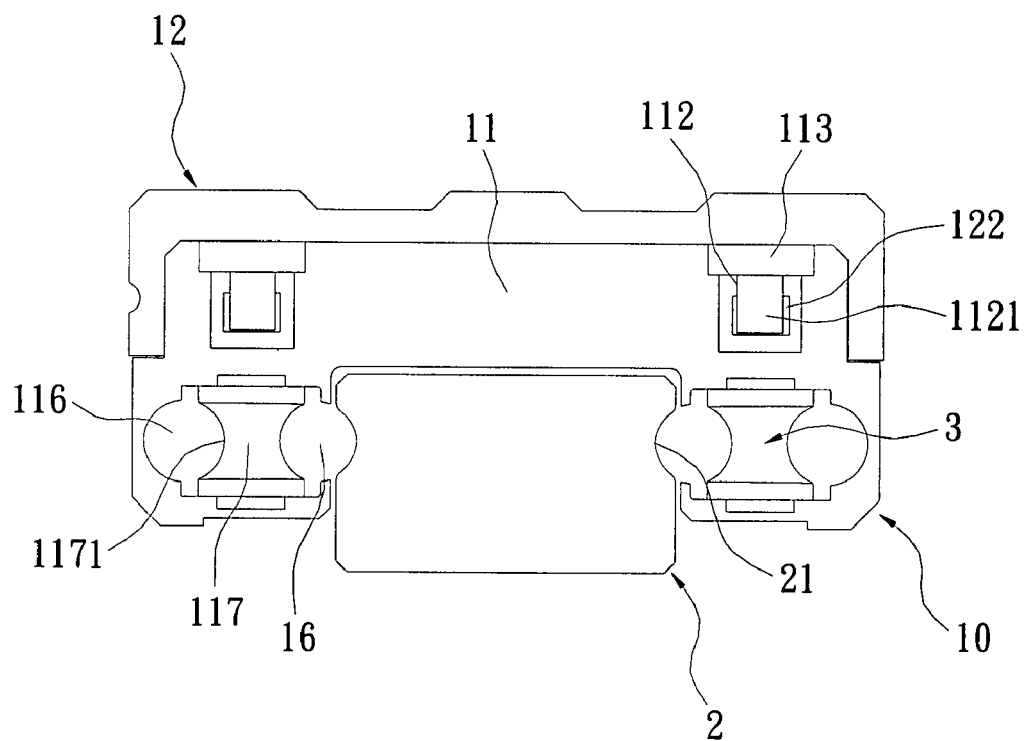
FIG. 6 is a schematic view showing a circumrotating circulating path of the engaging device of the linear sliding rail of the present invention.

Please refer to FIGS. 1 and 6. The connecting body 13 has two bent troughs 133 at the position facing one end of the sliding base body 10. The bent trough 133 is formed to correspond to the curved groove 1171 of the circumrotation guiding portion 117. The bent trough 133, the first channel 116, the second channel 16 and the curved groove 1171 together form a circumrotating circulating path 3. That is to say, the sliding block 1 is formed with two circumrotating circulating paths 3 on both sides of the sliding rail 2 respectively, which are closed circumrotating paths that allow rolling elements 4 to circulate between the sliding block 1 and the sliding rail 2.

The sliding block 1 is provided therein with a plurality of rolling elements 4. The rolling elements 4 can be rolling balls, rolling needles or rolling pillars (rolling balls in the present embodiment). The rolling elements 4 are collectively provided on a holder 5. The holders 5 separate the rolling elements 4 from one another and are provided on the circumrotating circulating path 3 in series. Via this arrangement, the action of the rolling elements 4 can be used to allow the sliding block 1 to linearly displace on the sliding rail 2 in a smooth way.

The two connecting bodies 13 are provided with a wiping piece 15 at the position opposing the other end of the sliding base body 10. The wiping piece 15 abuts against the surface of the sliding rail 2, so that it can remove foreign matters on the sliding rail when the sliding block 1 acts on the sliding rail 2, thereby preventing the foreign matters from entering the circumrotating circulating path 3 to affect the action of the sliding block 1.

Each of the two locking pieces 14 comprises a plate 141 and two hooks 142 extending downwardly from the plate 141 in the transverse direction. The hooks 142 of the two locking pieces 14 penetrate through the locking holes 1131 of the protruding plate 113 and the insertion holes 132 of the connecting body 13 to lock the two connecting bodies 13 at the front and rear ends of the sliding base body 10.

Figure 7:
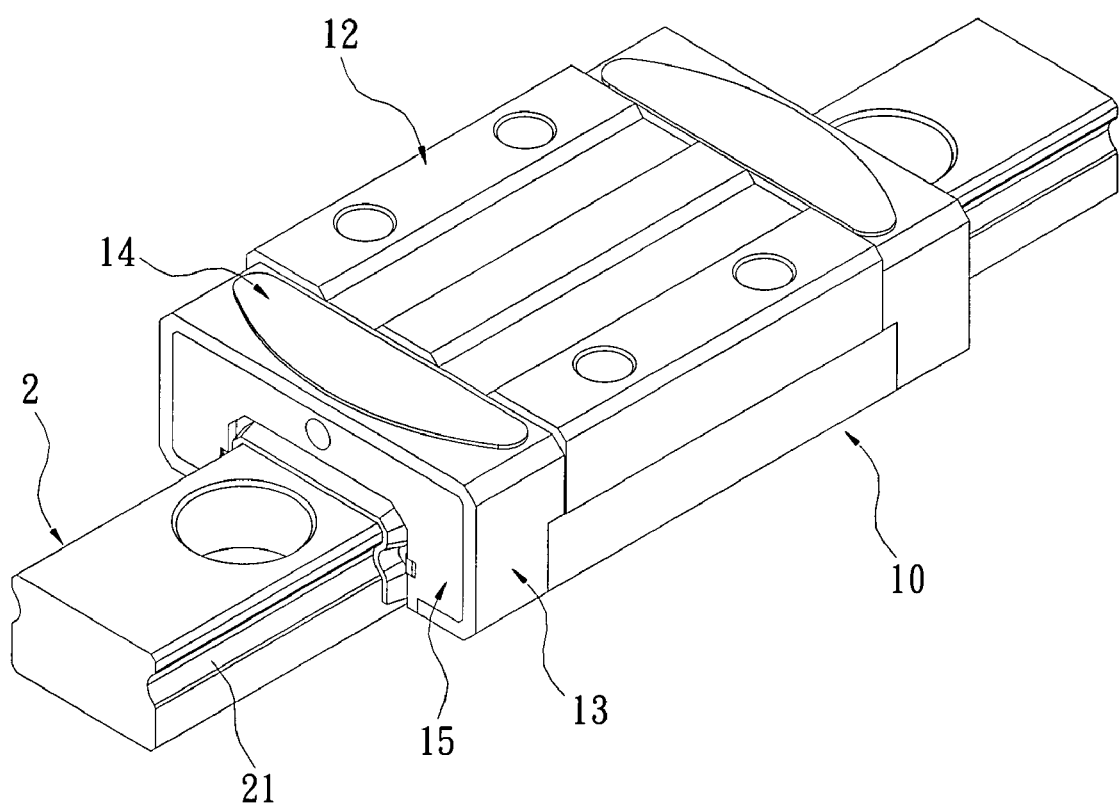
FIG. 7 is an assembled perspective view showing the engaging device of a linear sliding rail of the present invention.

Please refer to FIG. 7. With the above elements, a linear sliding rail can be formed, and the sliding block 1 can generate a desired linear displacement on the sliding rail 2.

It is worthy to mention that the hooks 142 of the locking piece 14 are formed in the transverse direction of the sliding block 1. In addition to lock at the lower edge of the protruding plate 113, one end of the hook 142 also abuts on the positioning plate 11 adjacent to the periphery of the through hole 111 (as shown in FIG. 5). When the sliding block 1 acts, it can generate an engaging effect to the positioning plate 11 in the longitudinal direction.

When the hook 142 is locked to the protruding plate 113, the hook 142 is located in the insertion slot 131 to abut against the inclined surface 1121 on one end of the abutting piece 112, so that the biasing portion 1122 of the abutting piece 112 extends toward the other end of the positioning plate 11 and abuts in the trough 122 of the supporting body 12. That is to say, the abutting pieces 112 of the two positioning plates 11 abut against the front and rear end faces of the supporting body 12 simultaneously.

The present invention has the advantageous effects as follows. The locking piece 14 is locked into the insertion slot 131 to abut against one end of the abutting piece 112 of the positioning plate 11. Therefore, when the locking piece 14 locks the two connecting bodies 13 to both ends of the sliding base body 10, it also generate a pre-pressure to press both ends of the supporting body 12, thereby assembling the supporting body 12 and the two connecting bodies 12 on the sliding base body 10 in a tight and firm manner. In this way, vibration, noise and wear can be avoided, and thus the linear sliding rail can perform a precise displacement smoothly.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An engaging device of a linear sliding rail, comprising:
a sliding rail; and
a sliding block arranged on the sliding rail, the sliding block comprising:
a sliding base body having two positioning plates on front and rear ends thereof, respectively, the positioning plates each having a plurality of through holes, a plurality of abutting pieces and a plurality of protruding plates, the through holes each penetrating through the front and rear ends of the positioning plate, the abutting piece being provided in the through hole, the protruding plate being formed by means of extending from the positioning plate, the protruding plate having engaging holes penetrating through the protruding plate;
a supporting body arranged between the two positioning plates of the sliding base body;
two connecting bodies each having a plurality of insertion slots and a plurality of insertion holes communicating a top surface of the connecting body with the insertion slot, the two connecting bodies being provided on front and rear ends of the sliding base body, and the protruding plate of the sliding base body being provided in the insertion slot; and
two locking pieces each comprising a plate and a plurality of hooks extending downwardly from the plate, the hooks of the two locking pieces penetrating through the locking holes of the protruding plate and the insertion holes of the connecting body to lock the two connecting bodies at the front and rear ends of the sliding base body, the hook abutting one end of the abutting piece, the abutting pieces of the two positioning plates abutting against front and rear end faces of the supporting body respectively.

2. The engaging device according to claim 1, wherein the abutting piece is formed by means of extending downwardly from an upper edge of the through hole, one end of the abutting piece has an inclined surface, the inclined surface begins at one end of the positioning plate to extend through the through hole gradually and obliquely from the upper edge of the through hole.

3. The engaging device according to claim 2, wherein the abutting piece has a biasing portion, the biasing portion is formed by means of extending from the other end of the abutting piece and is flush with the other end of the positioning plate.

4. The engaging device according to claim 3, wherein each of the front and rear end faces of the supporting body has a plurality of troughs, the biasing portion of the abutting piece abuts in the trough.

5. The engaging device according to claim 1, wherein the sliding base body has two first channels penetrating through the front and rear ends of the sliding base body.

6. The engaging device according to claim 5, wherein the supporting body has two extending portions, each of the two extending portions has an abutting surface at two opposing outside faces, the sliding base body has two hollowed portions formed to correspond to the extending portions, each of the underside of the hollowed portions has a supporting surface on both opposing insides of the sliding base body, the two extending portions penetrate through the two hollowed portions, the two abutting surfaces abut against the two supporting surfaces.

7. The engaging device according to claim 6, wherein each of the two extending portions has a first guiding groove on two facing insides for penetrating the front and rear ends of the extending portion, both sides of the sliding rail are provided with two second guiding grooves to correspond to the two first guiding grooves, the two first guiding grooves and the two second guiding grooves form two second channels.

8. The engaging device according to claim 7, wherein the front and rear ends of the sliding base body are provided with two circumrotation guiding portions, the circumrotation guiding portion is provided between outlets of the first channel and the second channel, the circumrotating guiding portion is provided with a curved groove, the curved groove is connected with the outlets of the first channel and the second channel.

9. The engaging device according to claim 8, wherein each of the two connecting bodies has two bent grooves, the bent groove, the first channel, the second channel and the curved groove of the circumrotation guiding portion together form a circumrotating circulating path.

10. The engaging device according to claim 9, wherein the sliding block is provided with a plurality of rolling elements, the rolling elements are provided on a holder, the rolling elements and the holder are collectively provided on the circumrotating circulating path.

11. The engaging device according to claim 1, wherein each of the two connecting bodies is provided with a wiping piece, the wiping piece is formed to correspond to the cross section of the sliding rail.

12. The engaging device according to claim 1, wherein the hook is formed by means of extending downwardly from the plate in the transverse direction, the hook is locked to the lower edge of the protruding plate, and the hook abuts against one end of the positioning plate.

* * * * *